United States Patent [19]

Duschek

[11] 4,205,709
[45] Jun. 3, 1980

[54] METAL FABRIC CELL PLATES FOR ALKALINE CELL ACCUMULATORS

[75] Inventor: Werner Duschek, Sigmaringendorf, Fed. Rep. of Germany

[73] Assignee: G. Bopp & Co. AG, Zurich, Switzerland

[21] Appl. No.: 938,001

[22] Filed: Aug. 30, 1978

Related U.S. Application Data

[63] Continuation-in-part of Ser. No. 805,998, Jun. 13, 1977, abandoned.

[30] Foreign Application Priority Data

Jun. 18, 1976 [CH] Switzerland ............. 7915/76

[51] Int. Cl.² .............................................. D03D 1/04
[52] U.S. Cl. ................................. 139/390; 429/140; 139/425 R
[58] Field of Search ............... 139/387 R, 388, 389, 139/390, 425 R; 429/140, 141; 428/257

[56] References Cited

U.S. PATENT DOCUMENTS

| 353,873 | 12/1866 | Meacom | 139/425 R |
|---|---|---|---|
| 1,968,725 | 7/1934 | Valkenburg | 139/390 |
| 2,350,457 | 6/1944 | Hendley | 139/390 |
| 2,350,752 | 6/1944 | Graf | 139/390 |
| 2,385,577 | 9/1945 | Jacob | 139/425 |
| 2,972,000 | 2/1961 | Boriolo | 429/140 |
| 2,981,783 | 4/1961 | Bushrod | 139/390 |
| 2,985,701 | 5/1961 | Brennan | 429/140 |
| 3,090,406 | 5/1963 | Koppelman et al. | 139/425 |
| 3,991,249 | 11/1976 | Yamashita et al. | 428/257 |

FOREIGN PATENT DOCUMENTS

| 674646 | 11/1963 | Canada | 429/140 |
|---|---|---|---|
| 1222737 | 1/1960 | France | 139/387 R |
| 79796 | 12/1962 | France | 428/257 |
| 1504818 | 10/1967 | France | 139/387 R |

Primary Examiner—Henry Jaudon

[57] ABSTRACT

A woven fabric cell plate for alkaline cell accumulators, which alternates in at least one of the warp and weft directions between areas of double layer and areas of combined single layer. The active mass of the accumulator is retained between the layers of the double layer areas. At least one of the warp and weft may be formed of metal wire, or one of the layers of the double layer areas may be formed of metal wire while the other layer is formed of a second material.

5 Claims, 5 Drawing Figures

Fig. 1
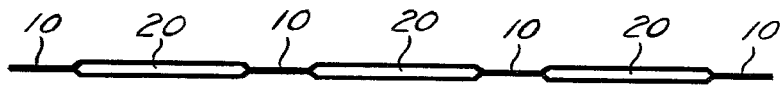
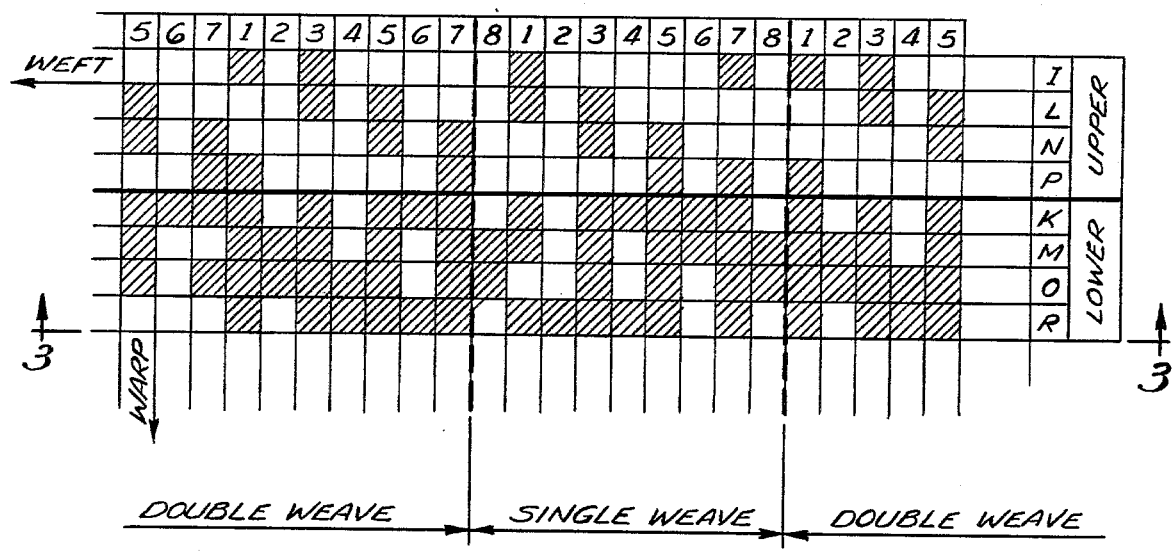
Fig. 2
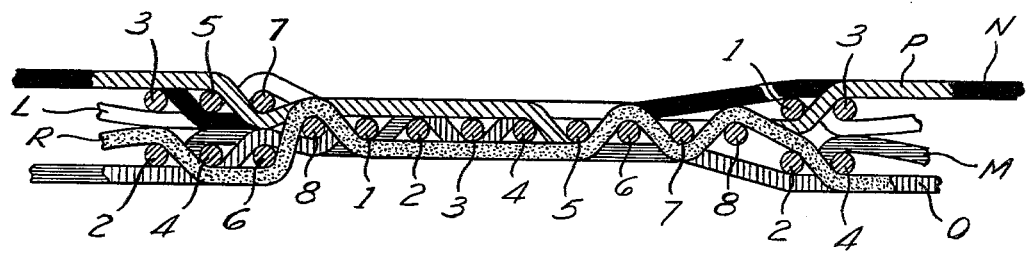
Fig. 3

METAL FABRIC CELL PLATES FOR ALKALINE CELL ACCUMULATORS

CROSS REFERENCE TO RELATED APPLICATIONS

This is a continuation-in-part of co-pending application Ser. No. 805,998, filed June 13, 1977 now abandoned.

BACKGROUND OF THE INVENTION

1. Field of the Invention

This invention relates to the field of cell plates for alkaline cell accumulators, and more particularly to the field of cell plates formed of fabrics woven at least partially from metal wire and including areas of double layer fabric forming containers for the active mass.

2. Description of the Prior Art

Tubular fabric cell plates are known in the art, but the conventional textile fabric cell plates are not strong enough for use in alkaline cell accumulators. Perforated sheet metal is commonly used for alkaline cell accumulators, but the cost of manufacture is relatively high, and the attainable ion exchange rate through the sheet metal is relatively low.

SUMMARY OF THE INVENTION

Therefore, it is an object of the present invention to provide a double layer metallic fabric suitable for use in cell plates for alkaline cell accumulators.

It is a further object of the present invention to provide a cell plate which consists of a plurality of double layered areas separated by areas of a single combined weave layer.

It is a still further object of the present invention to provide a fabric cell plate composed of a plurality of tubular areas alternating with areas of a single combined weave layer, in which the areas alternate in either the warp or the weft direction.

The present invention fulfills the above objects and overcomes the limitations of the prior art by providing a cell plate formed from a metallic fabric which is alternately double and single woven to provide areas of double and single combined layer fabric. These areas may be alternated in either the warp or the weft direction, or both. The fabric thus formed may include a plurality of tubular areas separated by single layer strips, or a pattern of sealed pocket shaped areas surrounded on all sides by single layered areas, or connected crossing tubular areas surrounding single layered squares.

The sizes of the double and single layered areas may be selected independently of the width of the cloth. When desired, the fabric can be cut along the single layered areas in order to produce material of complex shapes or even a single tube of fabric.

Additionally, the upper and lower walls of the tubes can be woven of different materials, for example, wire of different metals. The single layered areas are formed of a combination of the two materials. If the fabric is formed of materials of different elasticity, one or both of the cell walls will be convexly curved in the final product.

If one of the two walls of the tubular areas is formed of an insulating material such as plastic thread, this layer functions as the isolating wall between the cell plates, and the need for a separate isolating wall is eliminated.

Since the porosity of the fabric cell plates of the present invention is much greater than that of perforated sheet metal, the ion exchange rate with the active mass, for example, cadmium powder in nickel-cadmium batteries, is much greater than was previously attainable.

Use of the above described cell plates results in a great reduction of price, since the fabric of the present invention can be produced much more cheaply than the perforated sheet metal presently used.

BRIEF DESCRIPTION OF THE DRAWINGS

The invention will now be described in detail with reference to the accompanying drawings, in which:

FIG. 1 is a schematic cross-sectional view of the fabric cell plates according to the present invention;

FIG. 2 is a weaving diagram for the production of tubular fabric cell plates with the tubes extending in the warp direction;

FIG. 3 is a cross sectional view of a cell plate in accordance with the diagram of FIG. 2;

DESCRIPTION OF THE PREFERRED EMBODIMENTS

Referring to FIG. 1, the fabric cell plate of the present invention includes alternating areas of single weaving forming a combined single layer 10 and areas of double weaving forming a double layer area 20. The change in weaving can be effected in either the warp or the weft direction, causing the production of tubular cells extending in the warp or weft direction. Fabric formed of tubes extending in the weft direction can be more easily rolled up than fabric formed of tubes extending in the warp direction. If the weaving alternates in both the warp and the weft directions, either pocket shaped cells closed on all sides by combined single layer strips, or squares of single layered material surrounded by connected crossing tubes, are formed.

For producing the above-described fabric, at least five weaving shafts are necessary. For the following examples, eight shafts are used. The withdrawal of the warp wires is always made in numerical sequence 1-8.

In order to form a fabric including tubes running in the warp direction, the weaving process can be executed with the shafts in the sequence of positions shown in FIG. 2. The cross-hatched squares in the matrix of the diagram indicate areas in which the weft passes on one side of the warp, and the open squares represent areas in which the weft passes on the other side of the warp. The upper layer of the tubular section is formed by a four shaft twill, and the bottom layer is formed by a three shaft twill as shown in FIG. 3.

Instead of such a modified double four shaft process, a double three shaft process can be used.

Figure 5:
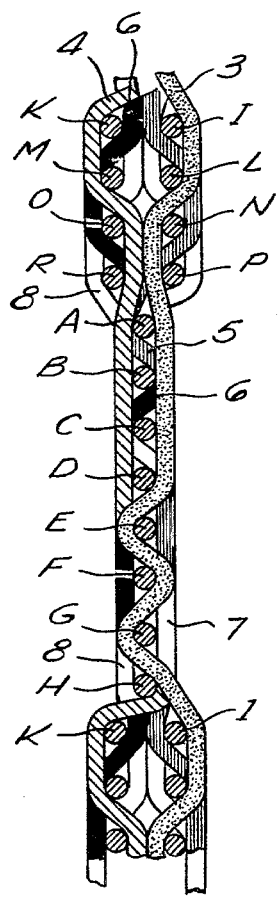
FIG. 5 is a cross sectional view of a cell plate in accordance with the diagram of FIG. 4.
Figure 4:
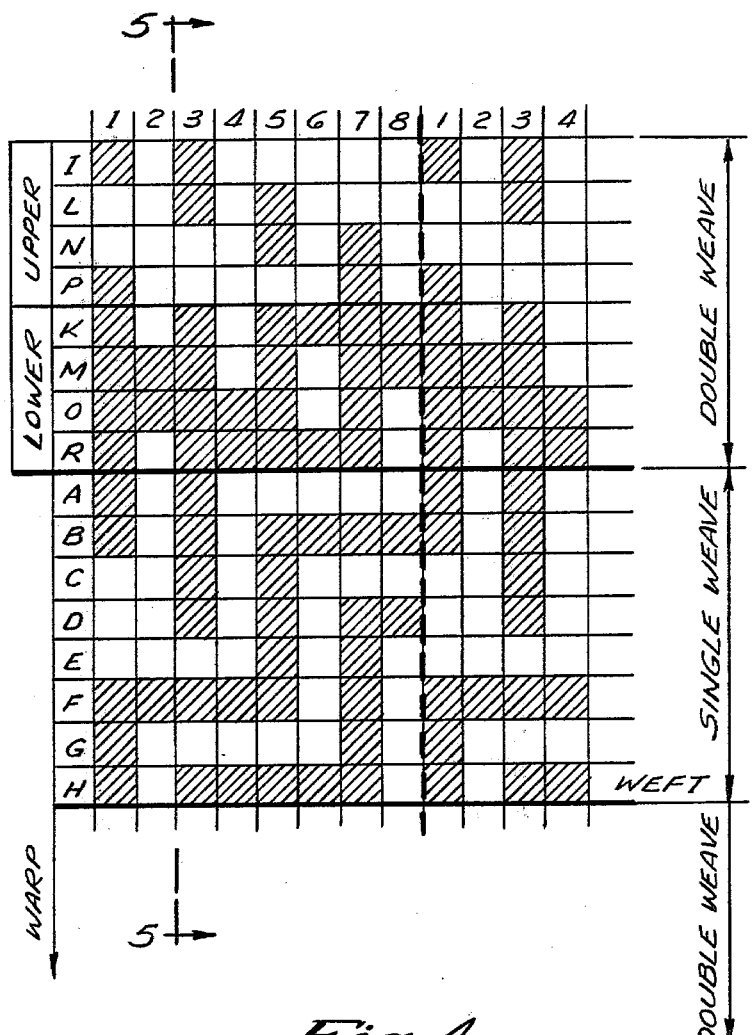
FIG. 4 is a weaving diagram for the production of tubular fabric cell plates with the tubes extending in the weft direction.

The weaving diagram of FIG. 4 shows the sequence of shaft positions for the production of fabric with the tubular areas extending in the weft direction. This weave results in the production of an eight shaft fabric as shown in FIG. 5.

In order to produce fabric having double and single layered areas alternating in both the warp and weft directions, the above-described weaves are combined.

Obviously, the fabric cell plates of the present invention can be made up of any of a great number of materials. In particular, the present invention could be formed of a combination of metal and plastic threads, such that one layer of the two layer areas would always be metal and the other layer would always be plastic. Alternatively, the two layers could be formed of two different types of metal wire.

From the foregoing, it can be readily realized that this invention can assume various embodiments. Thus, it is to be understood that the invention is not limited to the specific embodiments described herein, but is to be limited only by the appended claims.

What I claim is:

1. A cell plate for alkaline cell accumulators, said cell plate comprising a fabric including warp and weft, wherein said fabric includes areas alternating in at least one of the warp and weft directions, of double and single weaving forming alternating areas of double layer and combined single layer fabric, wherein said double layer areas form receptacles for containing the active mass, and wherein one of the layers of said double layer areas is formed of metal wires and the other of said layers is formed of a plastic thread.

2. A cell plate as claimed in claim 1, wherein said double layer areas form tubular receptacles for containing the active mass.

3. A cell plate as claimed in claim 1, wherein said double layer areas form pocket shaped receptacles for containing the active mass.

4. A cell plate as claimed in claim 1, wherein said fabric comprises materials of different elasticity, such that, after the fabric is woven, at least one of the layers of said double layer areas is convex.

5. A cell plate for alkaline cell accumulators, said cell plate comprising a fabric including warp and weft, wherein metal wire forms at least one of the warp and weft, wherein said fabric includes areas alternating in at least one of the warp and weft directions of double and single weaving forming alternating areas of double layer and combined single layer fabric, wherein said double layer areas form receptacles for containing an active mass, and wherein a first layer of said double layer areas include wires of a first metal and a second layer includes wires of a second metal.

* * * * *